United States Patent [19]

Prunbauer

[11] Patent Number: 4,977,767
[45] Date of Patent: Dec. 18, 1990

[54] HIGH-SECURITY FLAT KEY AND LOCK THEREFOR

[75] Inventor: Kurt Prunbauer, Herzogenburg, Austria

[73] Assignee: Evva-Werk Spezialerzeugung Von Zylinder- und Sicherheitsschlossern Gesellschaft M.B.H. & Co. Kommanditgesellschaft, Vienna, Austria

[21] Appl. No.: 328,469

[22] Filed: Mar. 24, 1989

[30] Foreign Application Priority Data

Mar. 31, 1988 [AT] Austria .................................. 861/88

[51] Int. Cl.⁵ .............................................. E05B 19/06
[52] U.S. Cl. ...................................... 70/406; 70/409; 70/495
[58] Field of Search ................. 70/495, 409, 420, 346, 70/347, 492, 392, 356, 406, 358

[56] References Cited

U.S. PATENT DOCUMENTS

| 2,039,126 | 4/1936 | Svoboda | 70/409 |
| 2,157,142 | 5/1939 | Olson | 70/406 |
| 3,035,433 | 5/1962 | Testa | 70/409 |
| 3,137,156 | 6/1964 | Navarro | 70/492 |
| 3,264,852 | 8/1966 | Gysin | 70/358 |
| 4,270,372 | 6/1981 | Vonlanthen et al. | 70/409 X |
| 4,516,416 | 5/1985 | Prunbauer et al. | 70/409 X |
| 4,860,562 | 8/1989 | Koren et al. | 70/392 X |

FOREIGN PATENT DOCUMENTS 0103532  3/1984  European Pat. Off. .............. 70/495

Primary Examiner—Lloyd A. Gall
Attorney, Agent, or Firm—Herbert Dubno; Andrew Wilford

[57] ABSTRACT

A flat key has a blade formed with bitting along at least one of its edges, with a pair of relatively shallow, outwardly open, and generally parallel but spaced grooves formed in at least one of its faces extending generally longitudinally in a nonstraight path from the tip, and with a relatively deep and outwardly open groove formed in the one face and extending generally longitudinally in a nonstraight path from the tip generally nonparallel to the shallow grooves. This key is used with a lock that has a relatively stationary lock housing containing a rotatable lock cylinder formed with an axially outwardly open flat passage shaped to snugly receive the key blade, and independent first and second slides displaceable in the cylinder generally of the axis and parallel to the one face of a key in the passage and provided with respective long and short formations engageable generally radially of the axis with the deep and shallow grooves. Thus the slides are shifted on insertion of the key by interengagement of the formations and the respective grooves. A lock element is displaceable in only one predetermined position of the slides between a position blocking rotation of the cylinder in the housing and a position permitting such rotation.

16 Claims, 5 Drawing Sheets

HIGH-SECURITY FLAT KEY AND LOCK THEREFOR

FIELD OF THE INVENTION

The present invention relates to a flat-key lock assembly. More particularly this invention concerns such a key and lock which has formations on the side of the key that cooperate with elements of the lock.

BACKGROUND OF THE INVENTION

A standard flat key, as opposed to an axially bitted tubular key, has an elongated blade formed along one or both edges with bitting that coacts with tumblers carried in the plug of the lock for the key. In a standard system with seven bits each of which can be at four or five different levels, the number of combinations available is large but by no means impossible to discover by random action. In addition such a lock frequently can be forced relatively easily as the physical strength of a small number of slim tumblers, which are all that block rotation of the plug in the cylinder, is small.

Furthermore picking such a lock when the plug is slightly loose in the housing is a simple matter of sliding a blade pick between the plug and housing while sequentially working the tumblers in and out to force the blade through the split between the tumblers.

A second line of security provided by a standard key is in the form of warding, that is grooves and ridges that extend along the faces of the blade of the key to impart to same a characteristic cross section. Such warding makes it impossible to fit into the lock a key or other tool that is not of the right section, and it has even been suggested to employ these grooves and ridges with further devices such as elements that prevent retraction of the key unless it is in a particular position. Such formations nonetheless add little to the number of combinations a key can be set to and do little to increase the physical resistance of the lock.

OBJECTS OF THE INVENTION

It is therefore an object of the present invention to provide an improved flat key.

Another object is the provision of such an improved flat key which overcomes the above-given disadvantages, that is which can be formed with a number of combinations that is substantially larger than has been hitherto possible.

Yet another object is to provide an improved lock for use with the improved flat key of this invention, one that offers improved resistance both to picking and forcing.

SUMMARY OF THE INVENTION

A flat key according to this invention has a blade formed with a pair of opposite edges, with a pair of opposite faces between the edges, and with an outer-end tip. In addition this blade is formed with bitting along at least one of its edges, with a pair of relatively shallow, outwardly open, and generally parallel but spaced grooves formed in at least one of the faces extending generally longitudinally in a nonstraight path from the tip, and with a relatively deep and outwardly open groove formed in the one ace and extending generally longitudinally in a nonstraight path from the tip generally nonparallel to the shallow grooves.

The deep groove according to this invention is between the shallow grooves and the shallow grooves have inner flanks separated by a spacing that is greater than the width of the deep groove. Furthermore the grooves flare parallel to the surface at and toward the tip.

In accordance with further features of the invention the grooves have control positions at which they extend substantially parallel to the blade and are inclined to the blade between the control positions. They can extend as straight-section zigzags or as more smoothly curved undulations. In fact each of the grooves has a plurality of such control positions and the control positions of the shallow grooves are transversely aligned and staggered relative to the control positions of the deep groove.

The lock according to this invention has a relatively stationary lock housing, a lock cylinder rotatable in the housing about an axis and formed with an axially outwardly open flat passage shaped to snugly receive the key blade, a first slide displaceable in the cylinder generally secantally of the axis and parallel to the one face of a key in the passage and provided with a formation engageable generally radially of the axis in the deep groove, and a second slide displaceable in the cylinder generally secantally of the axis and parallel to the one face of a key in the passage and provided with a formation engageable generally radially of the axis in the shallow grooves. Thus the slides are shifted secantally on insertion of the key by interengagement of the formations and the respective grooves. A lock element is displaceable in only one predetermined position of the slides between a position blocking rotation of the cylinder in the housing and a position permitting such rotation.

According to this invention the second slide has two such formations each complementary to a respective one of the shallow grooves and fixedly spaced transversely of the key blade relative to each other.

The deep groove in accordance with the invention intersects at least one of the shallow grooves. Guidance of the shallow-groove slide is maintained, however, because there are two shallow grooves so that even if one of the inner flanks is lost for guidance, the outer flank of the other groove will take over its task.

DESCRIPTION OF THE DRAWING

The above and other objects, features, and advantages will become more readily apparent from the following, reference being made to the accompanying drawing in which.

SPECIFIC DESCRIPTION

Figure 1:
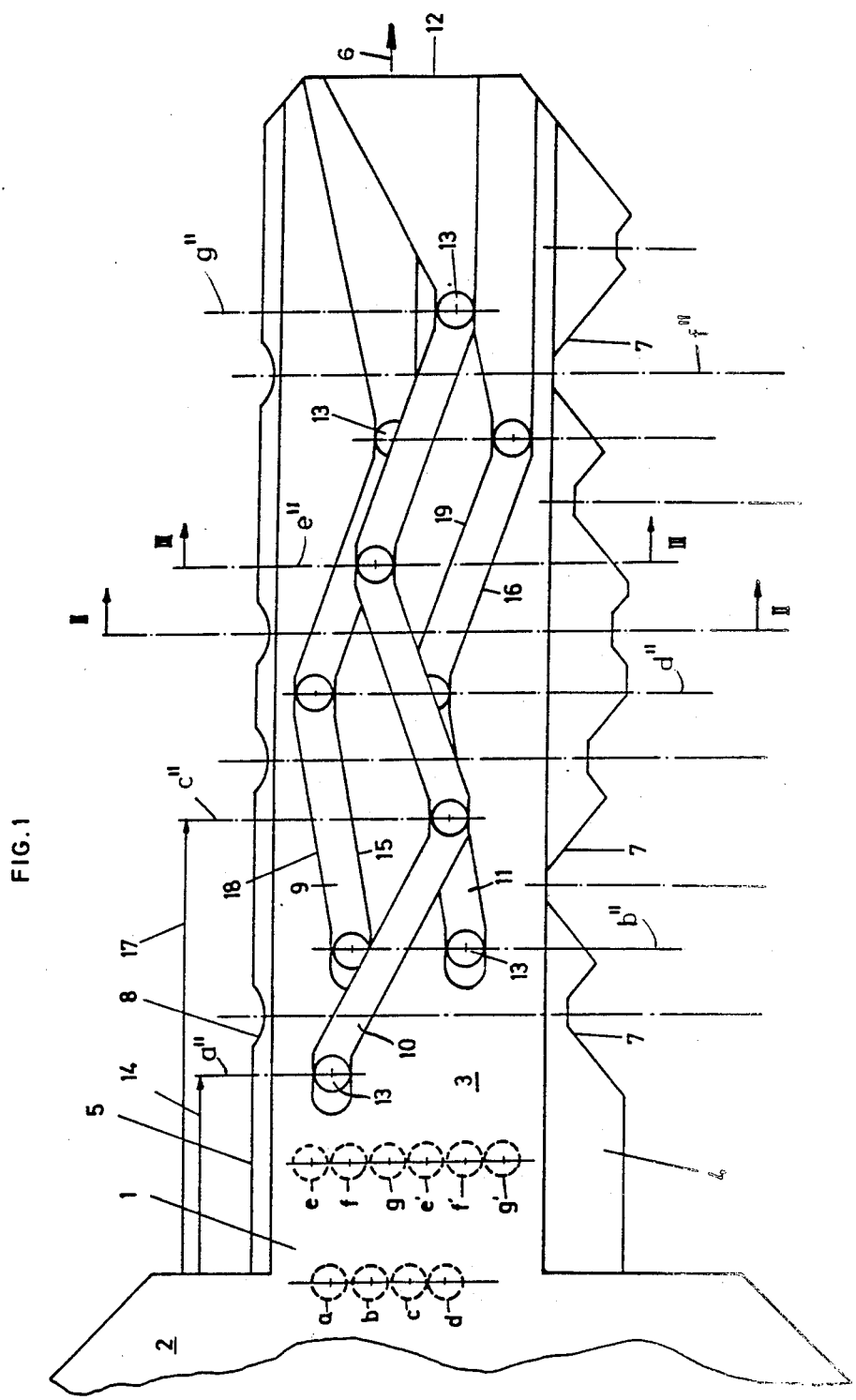
FIG. 1 is a large-scale side view of a key according to this invention.
Figure 2:
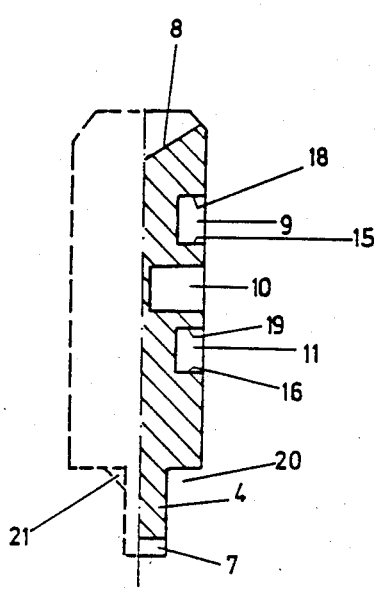
FIGS. 2 and 3 are sections taken respectively along line II—II and III—III of FIG. 1 but only showing the right-hand side of the key in detail.
Figure 3:
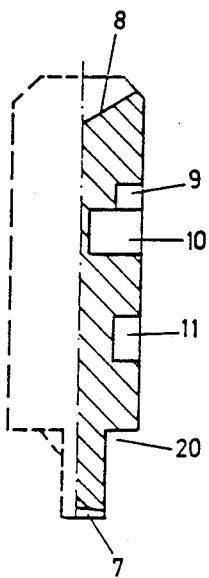

As seen in FIGS. 1, 2, and 3 a key 1 according to this invention has a bow 2 from which projects a flat blade 3 formed with a serrated or bitted front edge 4 and a generally straight back edge 5 both extending parallel to a longitudinal direction 6 along which the key 1 is inserted into a lock described below. The front edge 4 has bits 7 that cooperate with standard tumblers also described below and the back edge 5 is formed with a series of like notches 8 that similarly cooperate with elements of standard design.

According to this invention at least one face of the blade 3 is formed with three generally longitudinally extending and laterally open nonstraight grooves 9, 10, and 11. The two grooves 9 and 11 are of substantially the same width and extend parallel to each other but are spaced apart by a distance equal to a multiple of their widths. These outer grooves 9 and 11 are relatively shallow (See FIGS. 2 and 3). The groove 10 is substantially deeper than the grooves 9 and 11 and does not extend parallel to either of these grooves 9 and 11 over any significant portion of its length. In addition the groove 10 lies between the outer flank 18 of the groove 9 and the outer flank 16 of the groove 11 although at several locations it does cross or coincide with each of these grooves 9 and 11 and cut the inner flanks 15 and 19 of the grooves 9 and 11.

The groove 10 is inflected at positions 13 at levels indicated at a, b, c, and d in FIG. 1 and the grooves 9 and 11 are respectively inflected at positions 13 at levels indicated respectively at e, f, and g and e', f', and g' also in FIG. 1. The positions 13 of the groove 9 are level with those of the groove 11 but staggered relative to those of the groove 10. In addition the locations 13 are set at spacings 14 and 17 from the bow 2 that are regular. The grooves 9 and 11 all widen at an inner end or tip 12 of the blade 3.

Figure 4:
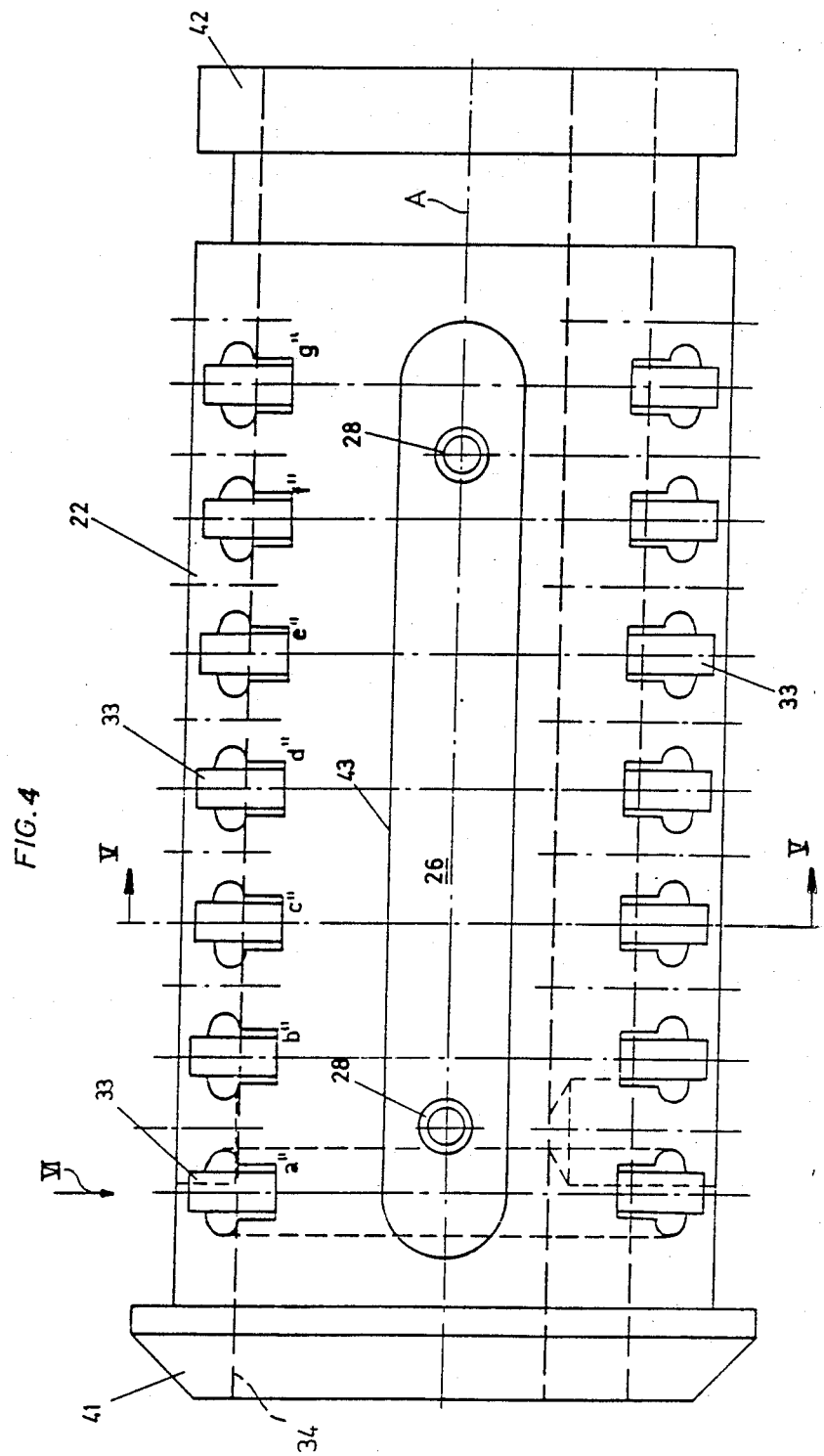
FIG. 4 is a large-scale side view of a lock according to the invention.
Figure 5:
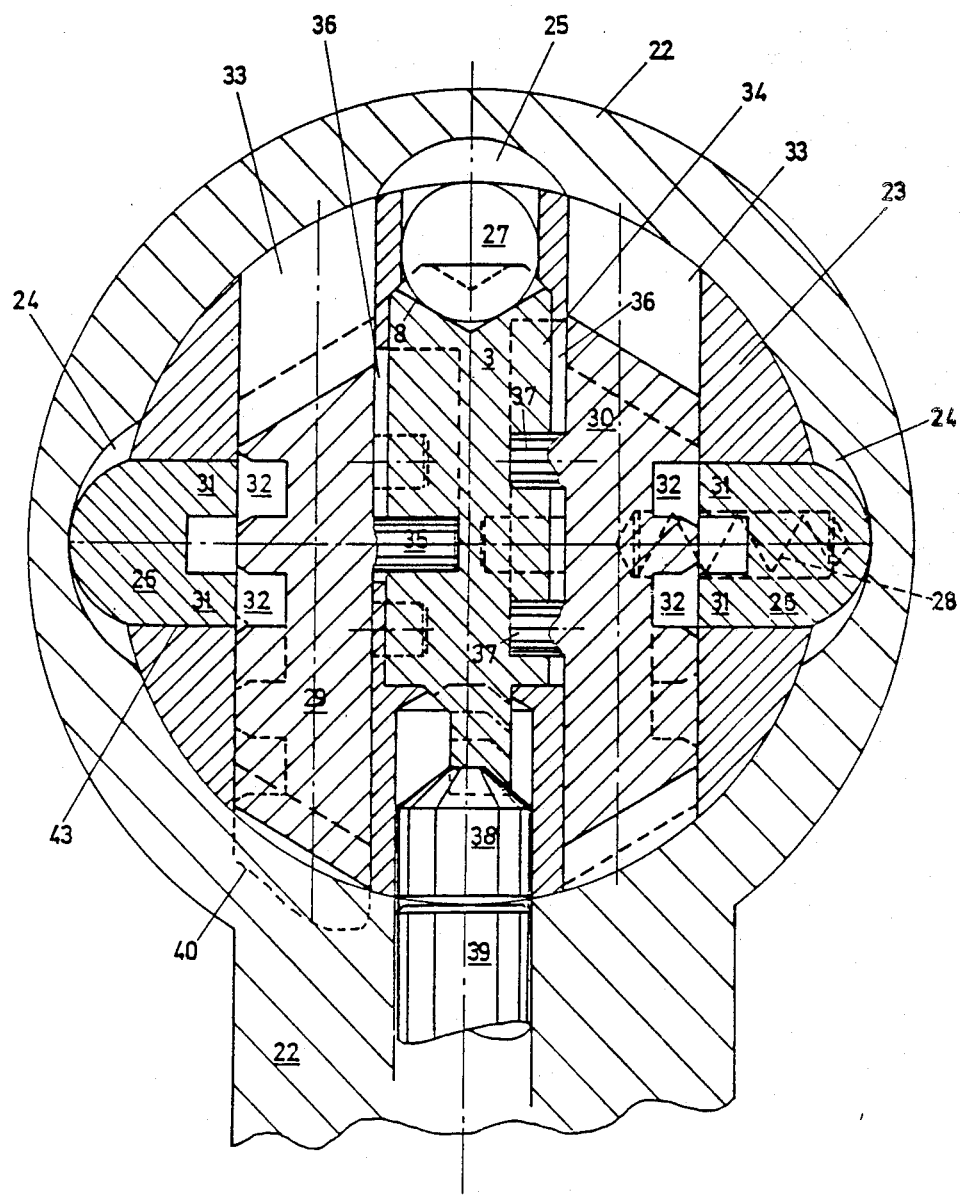
FIG. 5 is a section taken along line V—V of FIG. 4.
Figure 6:
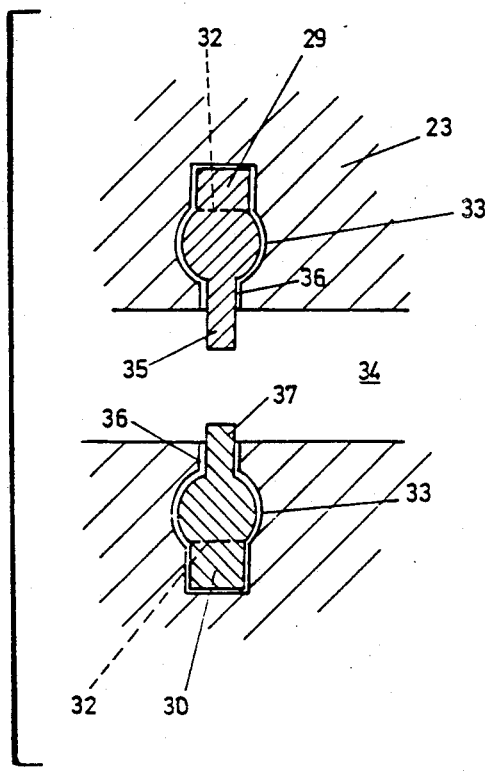
FIG. 6 is a sectional top view of the detail indicated at arrow VI of FIG. 4.

As seen in FIGS. 4, 5, and 6 the lock itself has a normally stationary housing sleeve 22 containing a cylinder or plug 23 centered on and rotatable in the sleeve 22 about an axis A. The housing 22 has a cylindrical inner wall centered on the axis A and formed with a pair of diametrically opposite, axially extending, and radially inwardly opening part-cylindrical grooves 24 and with a row of four inwardly open part-spherical pockets 25 between the grooves 24. Opposite the pockets 25 the housing 22 is extended and contains standard split-tumblers 38, 39 that coact with the bitting 7 in standard manner.

The plug 23 itself is provided on diametrically opposite sides with radially displaceable locking elements 26 formed as axially elongated bars having rounded outer ends engageable in the grooves 24. In addition the plug 23 carries standard retaining balls 27 aligned with and engageable in the respective pockets 25 and complementary to the notches 8 in the back edge 5 of the key blade 3. Springs 28 urge the locking bars 26 radially outward and each of these locking bars 26 is formed with a plurality of radially inwardly projecting pegs 31 engageable in seats 32 formed in slides 29 and 30 slidable tangentially of the axis A in respective tangential passages 33 formed in the plug 23.

There are three of the slides 29 on each side of a central axial passage 34 complementary to the key blade 3 and four of the slides 30 alternating with the slides 29 so that each bar 26 has fourteen such pegs 31 and each such slide 29 or 30 has two such seats 32. The slides 29 and 30 are axially equispaced at locations indicates at a" through g" in FIGS. 1 and 4. The recesses 33, which are each of basically cylindrical shape with a square outer extension as shown in FIG. 6, open via respective slots 36 into the key passage 34. In this arrangement the slides 29 at the locations a", c", e", and g" each have two short cylindrical pins 37 intended to engage in the outer grooves 9 and 11 and of the same diameter as the inner width of these grooves. The slides 30 which are provided at the locations b", d", and f" each only have one such cylindrical pin 35 which engages through the respective slot 36 with the middle groove 10, these pins 35 being longer than the pins 37 to fit complementary in the deeper groove 10.

In addition the housing 22 may be formed in line with one or all of the slides 29 and/or 30 with a tangentially inwardly opening pocket 40 into which one of the slides 29 or 30 may fit. Furthermore the outer end of the housing 22 is formed with a standard rim 41 that is clamped against the door or the like that the lock of this invention is used on and the opposite end 42 is shaped to fit with latch-operating mechanism of standard design. Each side of the housing 22 is formed with an axially elongated round-ended aperture 43 slidably receiving the respective lock bar 26.

The lock described above functions as follows:

When there is no key in the passage 34 most of the slides 29 and 30 will be in positions with the seats 32 misaligned with the respective pegs 31. In addition of course the split between the tumblers 38 and 39 will not be aligned with the break between the housing 23 and plug 22, and at least some of the slides 29 and/or 30 will be fitting in the respective pockets 40. As a result the bars 26 will not be able to enter the plug 23 to clear the recesses 24, the tumblers 38, 39 will in traditional fashion block rotation of the plug 23, and even the slide 29 and 30 in the pockets 40 will block rotation. Thus even if a slim pick is slid between the plug 23 and housing 22 while the tumblers 38, 39 are worked, it will be impossible to free the plug 23 in the housing 23. What is more a key even with the proper bitting 7 but with no grooves on its faces cannot even be fitted to the passage 34.

On the other hand if a key 1 with the proper bitting 7 and grooves 9, 10, and 11 and formed with the appropriately positioned inflections 13 and notches 8 is inserted into the passage 34 the split tumblers 38 and 39 will be properly positioned as is standard, the balls 27 will be able to drop into the notches 8 to clear the pockets 25, and the pins 35 and 37 will fit into the grooves 9 through 11 and the respective slides 29 and 30 will be cammed by interaction of the pins 35 and 37 and these grooves 9 through 11 into positions with the seats 32 aligned with the pegs 31. When the key 1 is then turned the locking bars 26 will be cammed inward and the plug 23 will be able to turn in the housing 22.

Once, however, the plug 23 is turned somewhat, the bars 26 and balls 27 will be unable to move outward until the plug 23 is returned to the illustrated starting position. Retraction of the key 1 is therefore impossible because the balls 27 will not be able to move out of the notches 8 and the slides 30 will not be able to move tangentially as is necessary as the pins 35 and 37 track the grooves 9 through 11.

Even though the middle groove 10 overlaps the grooves 9 and 11 as shown at positions c" through f" in FIG. 1, the pins 37 will not be left without guidance because they are provided in pairs. Thus when, for instance, in position f" the one pin 37 will lose engagement with the inner flank 15 of the groove 9, the other pin 37 of the respective slide 30 will be in contact with the outer flank 16 of the other outer groove 11, and guidance will be maintained. Similarly when the one pin 37 loses contact with the inner flank 19 of the groove 11 between positions c" and d", the other pin 37 of the respective slide 30 will remain in contact with the outer flank 18 of the other outer groove 9 to maintain guidance. Since the groove 10 is deeper than the grooves 9 and 11 and the pin 35 is complementary longer, there is no problem of loss of guidance of the pin 35 when the groove 10 crosses or intersects one of the grooves 9 and 11.

The lock of the instant invention provides therefore a very high degree of security. In addition to the standard bitting 7, the interaction of the eight slides 29 in the four positions a through d and of the six slides 30 in the positions e through g' makes it possible to have a vast number of combinations available. Furthermore blocking rotation of the plug 23 with the bars 26 means that even forcing of the lock of this invention is substantially more difficult than forcing a standard prior-art lock.

I claim:

1. A flat key having a blade formed with a pair of opposite edges, with a pair of opposite faces between the edges, and with an outer-end tip, the blade further being formed with:
   a pair of relatively shallow, outwardly open, and generally parallel but spaced grooves formed in at least one of the faces extending generally longitudinally in a nonstraight path from the tip; and
   a relatively deep and outwardly open groove formed in the one face mainly between the shallow grooves and extending generally longitudinally in a nonstraight path from the tip generally nonparallel to the shallow grooves.

2. A flat key having a blade formed with a pair of opposite edges, with a pair of opposite faces between the edges, and with an outer-end tip, the blade further being formed with:
   a pair of relatively shallow, outwardly open, and generally parallel but spaced grooves formed in at least one of the faces extending generally longitudinally in a nonstraight path from the tip; and p1 a relatively deep and outwardly open groove formed in the one face intersecting at least one of the shallow grooves and extending generally longitudinally in a nonstraight path from the tip generally nonparallel to the shallow grooves.

3. The key defined in claim 2 wherein the grooves all have control positions at which they extend substantially parallel to the blade and are inclined to the blade between the control positions.

4. The key defined in claim 3 wherein each of the grooves has a plurality of such control positions.

5. The key defined in claim 4 wherein the control positions of the shallow grooves are transversely aligned and staggered relative to the control positions of the deep groove.

6. A flat key having a blade formed with a pair of opposite edges, with a pair of opposite faces between the edges, and with an outer-end tip, the blade further being formed with:
   a pair of relatively shallow, outwardly open, and generally parallel but spaced grooves formed in at least one of the faces extending generally longitudinally in a nonstraight path from the tip; and
   a relatively deep and outwardly open groove formed in the one face and extending generally longitudinally in a nonstraight path from the tip generally nonparallel to the shallow grooves, the grooves each having a plurality of control positions at which they extend substantially parallel to the blade and are inclined to the blade between the control positions, the control positions of the shallow grooves being transversely aligned and staggered relative to the control positions of the deep groove.

7. The key defined in claim 6 wherein the deep groove is mainly between the shallow grooves.

8. The key defined in claim 7 wherein the shallow grooves have inner flanks separated by a spacing and the deep groove has a width smaller than the spacing.

9. The key defined in claim 6 wherein the grooves all flare parallel to the one face at and toward the tip.

10. The key defined in claim 6, further comprising bitting along at least one of the edges.

11. The key defined in claim 6, wherein the deep groove intersects at least one of the shallow grooves.

12. A flat key having a blade formed with a pair of opposite edges, with a pair of opposite faces between the edges, and with an outer-end tip, the blade further being formed with:
   bitting along at least one of the edges;
   a pair of relatively shallow, outwardly open, and generally parallel but spaced grooves formed in at least one of the faces extending generally longitudinally in a nonstraight path from the tip; and
   a relatively deep and outwardly open groove formed in the one face and extending generally longitudinally in a nonstraight path from the tip generally nonparallel to the shallow grooves, the grooves each having a plurality of control positions at which they extend substantially parallel to the blade and are inclined to the blade between the control positions, the control positions of the shallow grooves being transversely aligned and staggered relative to the control positions of the deep groove.

13. The key defined in claim 12 wherein the deep groove is mainly between the shallow grooves.

14. The key defined in claim 13 wherein the shallow grooves have inner flanks separated by a spacing and the deep groove has a width smaller than the spacing.

15. The key defined in claim 12 wherein the grooves all flare parallel to the one face at and toward the tip.

16. The key defined in claim 12 wherein the deep groove intersects at least one of the shallow grooves.

* * * * *